(12) United States Patent
Goodman et al.

(10) Patent No.: US 12,095,931 B2
(45) Date of Patent: Sep. 17, 2024

(54) CHAINED CRYPTOGRAPHICALLY SIGNED CERTIFICATES TO CONVEY AND DELEGATE TRUST AND AUTHORITY IN A MULTIPLE NODE ENVIRONMENT

(71) Applicant: Dell Products L.P., Round Rock, TX (US)

(72) Inventors: Bradley Goodman, Nashua, NH (US); Kirk Hutchinson, Londonderry, NH (US); Anurag Sharma, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 17/724,834

(22) Filed: Apr. 20, 2022

(65) Prior Publication Data

US 2023/0344648 A1 Oct. 26, 2023

(51) Int. Cl.
*H04L 9/32* (2006.01)

(52) U.S. Cl.
CPC ............ *H04L 9/3265* (2013.01); *H04L 9/321* (2013.01); *H04L 9/3234* (2013.01); *H04L 9/3247* (2013.01); *H04L 2209/127* (2013.01)

(58) Field of Classification Search
CPC ..... H04L 9/3265; H04L 9/321; H04L 9/3234; H04L 9/3247; H04L 2209/127
See application file for complete search history.

(56) References Cited

U.S. PATENT DOCUMENTS

| 10,122,615 | B2 | 11/2018 | Mahadevan et al. | |
| 11,824,856 | B1 * | 11/2023 | Sharma | H04L 9/3213 |
| 2021/0112020 | A1 | 4/2021 | Radhakhrishnan | |
| 2021/0399903 | A1 * | 12/2021 | Brossard | H04L 9/3247 |

FOREIGN PATENT DOCUMENTS

WO WO-2023012127 A1 * 2/2023 ............. G06F 21/64

* cited by examiner

*Primary Examiner* — Bryan Y Lee
(74) *Attorney, Agent, or Firm* — Larson Newman, LLP

(57) ABSTRACT

An information handling system includes a memory and a processor. The memory stores an owner public key associated with an owner of the information handling system. The processor receives a cryptographically signed message including a chain of certificates that includes first and second certificates. The processor determines whether the first certificate within the chain of certificates delegates authority to a first user based on the owner public key. In response to the first certificate delegating authority to the first user, the processor determines whether the second certificate delegates authority from the first user to a second user. Based on the first and second certificates, the processor verifies the cryptographically signed message as an authoritative message. In response to the cryptographically signed message being verified as the authoritative message, the processor executes a request associated with the cryptographically signed message.

15 Claims, 4 Drawing Sheets

CHAINED CRYPTOGRAPHICALLY SIGNED CERTIFICATES TO CONVEY AND DELEGATE TRUST AND AUTHORITY IN A MULTIPLE NODE ENVIRONMENT

FIELD OF THE DISCLOSURE

The present disclosure generally relates to information handling systems, and more particularly relates to chained cryptographically signed certificates to convey and delegate trust and authority in a multiple node environment.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system stores an owner public key associated with an owner of the information handling system. The system may receive a cryptographically signed message including a chain of certificates that includes first and second certificates. The system may determine whether the first certificate within the chain of certificates delegates authority to a first user based on the owner public key. In response to the first certificate delegating authority to the first user, the system may determine whether the second certificate delegates authority from the first user to a second user. Based on the first and second certificates, the system may verify the cryptographically signed message as an authoritative message. In response to the cryptographically signed message being verified as the authoritative message, the system may execute a request associated with the cryptographically signed message.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
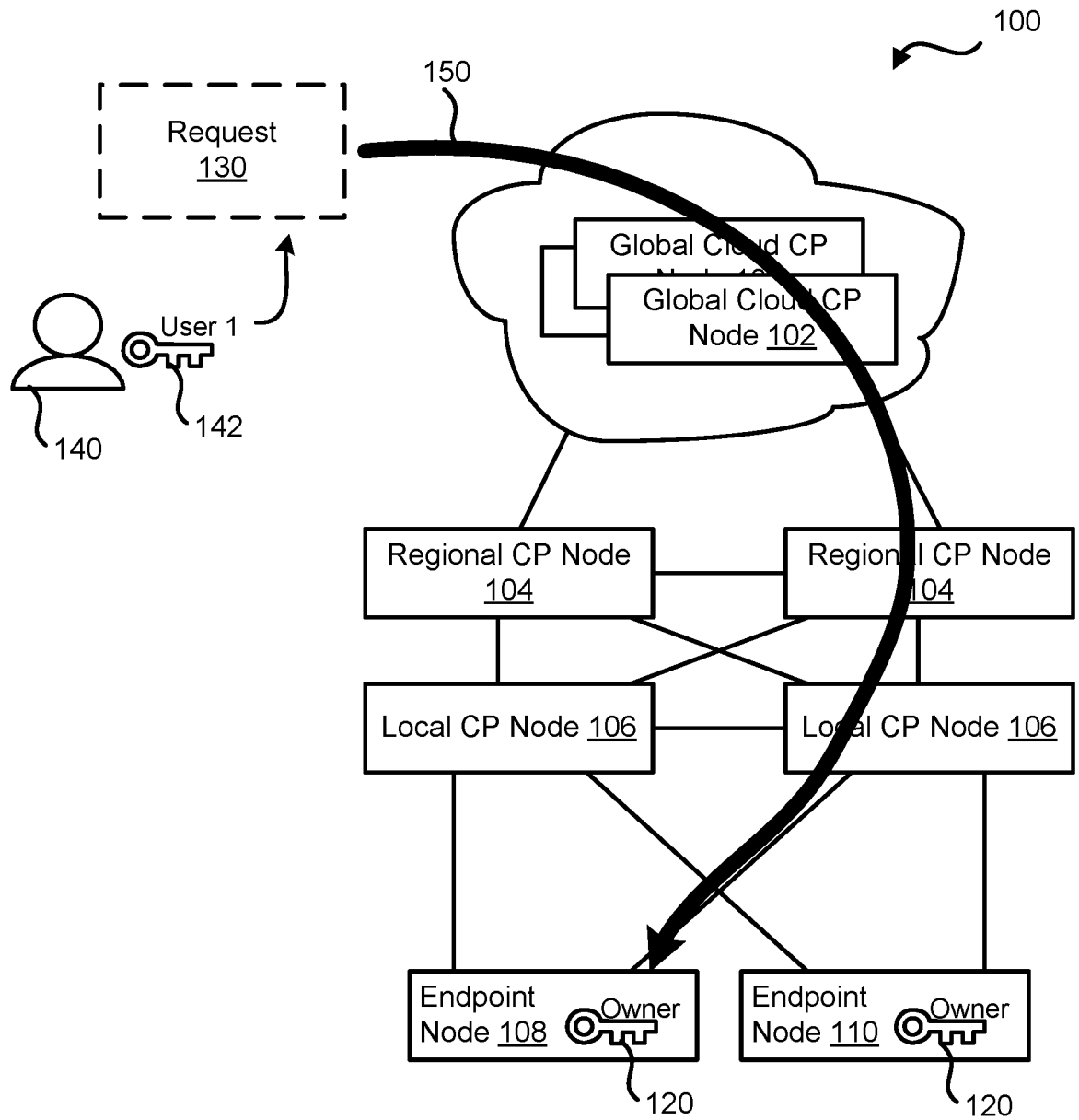
FIG. 1 is a block diagram of multiple node environment according to at least one embodiment of the present disclosure.

FIG. 1 illustrates a multiple node environment 100 according to at least one embodiment of the present disclosure. Multiple node environment 100 includes global cloud control-plane (CP) nodes 102, regional CP nodes 104, local CP nodes 106, and endpoint nodes 108. In an example, global CP nodes 102, regional CP nodes 104, local CP nodes 106, and endpoint nodes 108 may be any suitable information handling systems, such as substantially similar to information handling system 400 of FIG. 4, wherein each node may include a memory and a processor as described above with respect to FIG. 4. Multiple node environment 100 may include any suitable number of global CP nodes 102, regional CP nodes 104, local CP nodes 106, and endpoint nodes 108 without varying from the scope of this disclosure.

In an example, each of endpoint nodes 108 and 110 may store an owner public key 120 in a respective memory within each endpoint node. Owner public key 120 may be utilized by endpoint nodes 108 and 110 to authenticate any received messages as will be described in detail below. In certain examples, owner public key 120 may be hard coded within endpoint nodes 108 and 110 or any other suitable node outside of the control plane of multiple node environment 100. Owner public key may be associated with the owner of endpoint nodes 108 and 110, such as a company, a user, or the like. In an example, security of owner public key 120 may be increased based on the owner public key being stored within a trusted platform module of endpoint node 108 and in a trusted platform module of endpoint node 110.

In certain examples, multiple node environment 100 may be an isolated, disconnected, or disaggregated environment. As used herein an isolated, disconnected, or disaggregated environment may include an environment with control planes that expand beyond a simple rack or datacenter, beyond a highly available cloud service, or the like. For example an isolated, disconnected, or disaggregated environment may expand to devices beyond buildings, vessels, cities, continents, the edges of the planet, or the like. In an example the further the control planes expand the more disaggregated the entire environment or topology becomes, including the control plane itself. As such, the communication links or paths illustrated between the nodes of multiple node environment 100 may cover any suitable distance.

In an example, multiple node environment 100 may be disaggregated when the multiple node environment has any suitable characteristics. For example, characteristics of a disaggregated multiple node environment 100 may include, but are not limited to, no defined hierarchy of authority, information may flow in any direction, information may originate from any point or node within the environment, topologies of the environment may be large, and connectivity between nodes may be bad, intermittent, or questionable or any suitable reason. For example, connectivity may be bad, intermittent, or questionable because of connectivity issues, limitations, problems or costs at remotes sites or nodes, such as endpoint nodes 108 and 110. Connectivity may be bad, intermittent, or questionable by design due to security concerns, such as a desire to keep machines, such as endpoint nodes 108 and 110, offline or hidden. Connectivity may be bad, intermittent, or questionable because of the mere scale of multiple node environment 100. For example, the larger or more nodes within multiple node environment 100, the greater the odds of something being wrong at a given point-in-time.

Additionally, a disaggregated multiple node environment 100 may have no defined hierarchy of authority between nodes 102, 104, 106, and 108. In this situation, no specific node may be 'in-charge' or hold any 'authoritative' piece of information. In a particular situation, if a node is 'in-charge' or 'authoritative', it may not be clear as to the node that is authoritative. For example, one control plane could serve different entities, such as plants, divisions, tenants, or companies, and each entity may have its own concept of 'authority'. In an example, these authorities may be centered around different places on a topology.

In certain examples, information may flow in any direction in multiple node environment 100, and the information may provide different purposes. For example, some of the information may be provided for certificate or other data replication purposes, some of the information may be provided for command/control/response purposes, or the like. In an example, information may originate from any node 102, 104, 106, 108, or 110 within multiple node environment 100. In certain examples, not all data is replicated in all nodes 102, 104, 106, 108, and 110. Additionally, data that is replicated in all nodes 102, 104, 106, 108, and 110 may not be considered to be consistent among all of the nodes. In fact, the replicated data may be inconsistency more than it is consistent among nodes 102, 104, 106, 108, and 110 based on a topology of multiple node environment 100.

In an example, multiple node environment 100 may include different topologies, such as an 'east/west' or peer nodes topology, 'north/south' or hierarchy nodes topology nodes, or the like. Peer nodes, such as regional nodes 104 or local CP nodes 106, may generally share data and work closely together for availability purposes within multiple node environment 100. In topologies between hierarchy nodes, such as one regional node 104 and a local CP node 106, the regional node may be responsible for overall management of a region, and the local CP node may be responsible for more day-to-day operations of a specific site. Topologies may be large, complex.

In certain examples, distributed systems, such as multiple node environment 100, may be inherently not monolithic. When a simple access system is distributed, the system may become difficult or impossible to secure, such that the system is left open for wider attack vectors. In an example, distributed or disaggregated multiple node environment 100 may have any suitable number of complexities including, but not limited to, storage of information, logic to make decisions based on the stored information, and the actions performed by an entity or endpoint node.

In multiple node environment 100, the information should be shared and synchronized among the nodes in the environment or system, such as nodes 102, 104, 106, 108, and 110. However, as the size of multiple node environment 100 increases, the chance of the information in each node being out-of-sync at any point-in-time also increases. Additionally, the synchronization rules in multiple node environment 100 become more complex. In this situation, the complexity of the synchronization rules and the large size of multiple node environment 100 may result in conflicts between merging/synchronizing the states of endpoints 108 and 110. For example, if the state of endpoint node 108 has a first user as an administration but the state of endpoint node 110 has the first user as a user, there should be a way to reconcile the different states. In certain examples, a way or rule to reconcile the different states is to make the state stored in each endpoint node 1208 and 110 to be authoritative for that endpoint node. For example, anything stored in endpoint node 108 must be accepted as true in endpoint node 108, and anything stored in endpoint node 110 must be accepted as true in endpoint node 110.

In an example, information may be stored and synchronized in one node, such as endpoint node 108, but the logic that uses the stored information to make access decisions may be located or stored in another node, such as a CP node 106. In this example, the data or information may need to be stored in the correct node, such as endpoint node 108, may be needed to enable CP node 106 to implement the access decision logic. This storage of the correct data or information may need to be done in any situation including, but not limited to, during periods when endpoint node 108 is disconnected from the other nodes of multiple node environment 100. In this situation, a control plane node, such as CP node 106, may need either real-time online access to a storage device within endpoint node 108, or constant replication of the information within multiple node environment 100. In an example, CP node 106 should be assured that the stored device within endpoint node 108 is authoritative before the logic of the CP node accesses the storage device. In this example, a secure, verifiable communications channel should be established between the logic of CP node 106 and the storage device of endpoint node 108, and the assumption that once established, the communication channel is accurate.

In a distributed multiple node environment 100, the entity or node performing the final action, such as giving a user a file, may or may not be separate from the nodes implementing the logic. If the node is separate from node with the logic, it therefore means it's up to another node to implement the logic. In this situation, the node providing the data to the user should know of the separate node that will apply the logic and make access decisions. The node providing the data may not have any specific knowledge, such as storage or rules, such that the node providing the file must blindly trust the decisions of the node with the logic. Thus, if the node with the logic becomes compromised, this node may completely take over any and all aspects of that 'trusting' endpoint.

In certain examples, the operations of storage, logic, and providing of data may be performed by different nodes within multiple node environment 100. In these examples, each of the different nodes performing different operations may even more complexity to multiple node environment 100. As multiple node environment 100 increases in size, becomes more distributed or disaggregated, endpoint nodes 108 and 110 may have no control over data access. For example, other nodes within multiple node environment 100 may control replication of storage data while other nodes may implement the logic, and endpoint nodes may have to blindly trust the decisions and authority of these upstream control nodes. In this example, endpoint nodes 108 and 110 may be at the mercy of a large, distributed control system with many nodes, and a compromise at any one of these control plane nodes would compromise the entire multiple node environment 100.

In previous multiple node environments or systems, a database, file, or other type of data store within a control plane of the multiple node environment is used to keep track of all information related to access, identity and authorization. In these systems, one or more nodes within the control plane may store files with user's names and passwords, or databases with access control lists (ACLs), or the like. Additionally, these previous systems have a monolithic, trusted and authoritative source or node that may both store this information, using its own logic to determine who should be granted what access, and then choosing to perform or fail to perform an action dependent on the decisions made in this logic. The authoritative source may be a web server hosting a web site, a kernel controlling file access within an operating system, or the like.

In other previous systems, a control plane may implement the storage and the logic associated with the granting of rights to particular nodes. In this situation, the control plane may issue command to an endpoint node under the control of the control. The control plane may be deemed to be secure, trusted and authoritative, such that the endpoint node may blindly obey any commands issued by the control plane.

Multiple node environment 100 may be improved by an endpoint node not inherently trusting any particular node, but determine whether an issued command is authoritative based on one or more certificates in a cryptographically signed message received at the endpoint. For example, multiple node environment 100, may utilize cryptographic certificate chains to convey a hierarchy of delegated permissions and trust. In an example, these certificate chains may be used both for sending requests, and to delegate permissions and trust. In certain examples, the certificate chains may combine hierarchal attestation of users, ACL-type policies/rules and operational requests into a single, self-contained, independently verifiable message or document.

In certain examples, a request 130 may be provided to endpoint node 108 or 110 via any suitable manner. For example, request 130 may be cryptographically signed and transmitted along communication path 150. Request 130 may be signed by a trusted user. Nodes 102, 104, 106, 108, and 110 may convey messages to other nodes to make requests. The reception node may be endpoint node 108 or 110, or other control plane nodes 102, 104, or 106. Request 130 signed by a trusted user would be deemed valid and handled accordingly. While communication path 150 is shown traversing global cloud CP nodes 102, one regional CP node 104, one local CP node 106, to endpoint node 108, the request may be received by the endpoint node in any suitable manner. For example, a cryptographically signed message may be used to convey request 130, and the message may be pulled by endpoint 108 from a source or pushed to the endpoint. In an example, request 130 may include one or more certificates granting permissions to different users as will be described with respect to FIG. 2.

Figure 2:
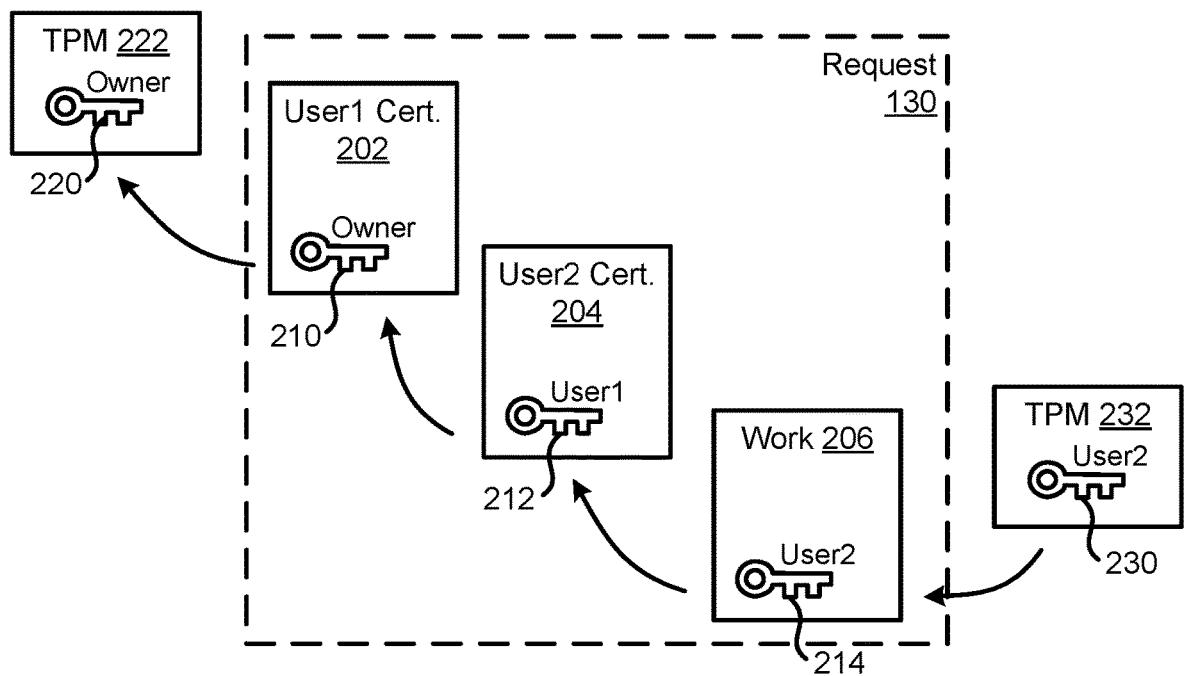
FIG. 2 is a diagram of a request including multiple certificates according to at least one embodiment of the present disclosure.

FIG. 2 illustrates request 130 including multiple certificates 202, 204, and 206 according to at least one embodiment of the present disclosure. Certificate 202 includes an owner private key signature 210, certificate 204 includes a first user private key signature 212, and certificate 206 includes a second user private key signature 214. Certificates 202, 204, and 206 may be created and signed by any user of multiple node environment 100. For example, an owner of an endpoint, such as endpoint 108 or 110, may have an information handling system with an owner private key 220 stored within a memory of the information handling system.

In an example, memory of the information handling may be located in a trusted platform module (TPM) 222 of the information handling system. In this example, owner private key 220 may be secured within TPM 222. Based on owner private key 220 being stored with TPM 222, the possibility of the owner private key being comprised is greatly reduced as compared to the owner private key being stored is a CP node of the disaggregated multiple node environment 100 of FIG. 1. In an example, a user, such as user 140 of FIG. 1, may have an information handling system with a second user private key 230 stored within a memory of the information handling system. In an example, memory of the information handling associated with the second user may be located in a TPM 232 of the information handling system. In this example, second user private key 230 may be secured within TPM 232. Based on second user private key 230 being stored with TPM 232, the possibility of the second user private key being comprised is greatly reduced as compared to the second user private key being stored is a CP node of the disaggregated multiple node environment 100 of FIG. 1.

As used herein, keys may use Public/Private key pairs in asymmetric encryption to establish methods for validating the authenticity of message or sending secrets. Private keys may be kept and held privately and may be used to assert that something was generated by the key holder. Public keys on the other hand may be utilized for public use to validate that something was approved by the holder of the associated private key. In an example, a certificate associated with a user and public key that is signed by a known, trusted entity may then attest that any message signed with that public key indeed came from that user.

In certain examples, request 130 may be self-authenticating, such that operations within the request may be performed without the receiving node needing to verify the source of the message. For example, request 130 may include any suitable number of certificates in an chain of certificates including, but not limited to, first user certificate 202, second user certificate 204, and work certificate 206. In certain examples, authentication of one certificate can be based on a signature associated with another certificate having the rights or permissions. For example, a user, such as user 140 of FIG. 1, may create work certificate 206 with second user private key signature 214 generated by second user private key 230, which may grant the work certificate 206 the permissions of second user certificate 204. Additionally, second user certificate 204 may include first user signature key 212 signed with a first user private key, which may grant the second user certificate with the permissions granted under first user certificate 202. First user certificate 202 may include owner signature key 210 generated by owner private key 220, which may grant specific permissions to the first user from the owner of an endpoint node.

As used herein, a certificate generally may be a document which is cryptographically signed by a known entity and may attest trust or identity of another person/user/role based on an identification of some public key. In an example, a certificate may only good if signed by a trusted user. However, if a trusted user issues a certificate conveying trust in another user, the certificate may confer additional trust in that user. The passing or linking of certificates may be referred to as certificate chains, or chains of trust. Certificates may be an example of information that may need to be transmitted or synchronized between CP nodes 102, 104, and 106 of FIG. 1. Previous control systems would put trust and access policies in databases which are difficult to synchronize in a disaggregate environment. Thus, multiple node environment 100 may be improved by using certificates to convey trust and permissions that merely requires such certificates to be copied amongst different places or nodes, such as nodes 102, 104, 106, 108, and 110. In an example, nodes 102, 104, 106, 108, and 110 holding certificates may then add the certificates to and manage their own databases for simplicity.

In an example, request 130 may include a cryptographically signed chain of certificates to delegate and convey both permissions and requests from an owner down to an endpoint node, such as endpoint node 108 or 110 of FIG. 1. In certain examples, the conveyance may be performed via any suitable number of operations or rules, and any suitable number of certificates in the chain of certificates. For example, an endpoint node 108 or 110 of FIG. 1, may know an owner of the endpoint node, the endpoint node may do an operation requested by the owner, and the endpoint node may deem a request authoritative if the requester can prove delegated chain authority from the owner of the endpoint node.

In certain examples, ownership of an endpoint node may be conveyed via a cryptographic certificate, which contains a public key, such as owner public key 120 of FIG. 1, representing the owner of the endpoint node. The owner may retain the secret or private key portion of the key pair. For example, the owner may store owner private key 220 in TPM 222 of an information handling system associated with the owner user of the endpoint. In this example, owner private key 220 may be assigned or stored within the information handling system at manufacturing or initial-installation time. In an example, owner private key 220 may be stored through any suitable process or operation including, but not limited to, a secure onboarding process, such as FIDO/SDO, and some other 'enrollment' or 'provisioning' procedure. Owner private key 120 of FIG. 1 may assigned or stored within endpoint nodes 108 and 110 of FIG. 1 at manufacturing or initial-installation time.

In an example, endpoint nodes 108 and 110 may perform any operation within work certificate 206 of request or message 130 as long as the request includes a certificate chain with one certificate that has been cryptographically signed by the owner of the endpoint node. The endpoint node may utilize owner public key 120 of FIG. 1 to verify that one of the certificates within the request 130 has been generated by owner private key 220, which in turn may enable the endpoint node to deem that the request is an authoritative request. Additionally, the endpoint node may deem request 130 authoritative if the requester, such as a second user, can cryptographically prove the request has been delegated by the owner of the endpoint to issue the request. Thus, request 130 does not need to be signed directly by the owner but may be signed by a user for whom the owner delegated authority to make the request, or even someone delegated authority from a user delegated authority from the owner.

Request 130 includes a chain or list of messages/certificates, each cryptographically authorized by the previous one. In an example, the first user certificate 202 may be the certificate wherein the owner grants the first user particular permissions, which the first user may grant to a second user. In certain examples, each certificate 202, 204, and 206 in the chain of certificates may covey a permission being granted or a work request to be performed within the endpoint node. In the case of a permission being granted, each certificate 202, 204, and 206 may also convey a user to whom the permission is being granted. The certificate granting one or more permissions to another user also includes a public key associated with the user or entity receiving the permission as will be described in greater detail below. When a certificate is associated with a request for one or more operations to be performed, the destination endpoint node, such as endpoint node 108 or 110, is included in the certificate along with the operations to be performed.

In an example, a second user may generate request 130 for endpoint node 108 of FIG. 1, and send the request to the endpoint node. Request 130 may include any suitable number of certificates to enable the second user to request one or more operation to be performed in endpoint node 108. For example, second user may request that endpoint node 108 is rebooted. In an example, second user, via an information handling system, may place this request in work certificate 206 and cryptographically sign the work certificate with second user private key 230. As a result of work certificate 206 being signed with second user private key 230, the work certificate may include second user signature 214 which may be a hash distinguishable by the second user public key.

However, endpoint node 108 may not recognize the second user as a trusted or authorized user/entity. In this situation, request 130 may include second user certificate 204, which a first user may grant one or more permissions to the second user. For example, second user certificate 204 may grant the second user with the permission to delegate control over all nodes including endpoint node 108. In an example, the second user may be identified by second user certificate 204, which may include multiple fields. The fields of second user certificate 204 may include, but are not limited to, the second user name and second user public key. However, only second user retains the corresponding second user private key 230. In an example, the fields of second user certificate may be uniquely identified by a unique cryptographic hash. For example, the description of the permission being delegated from the first user to the second user, and second user certificate 204 may be hashed and cryptographically signed by the first user private key. The resulting first user signature 212 may be placed in second user certificate 204.

In certain examples, owner of endpoint node 108 may grant the first user permission to delegate all authority in first user certificate 202. For example, first user certificate 202 includes the permissions granted to the first user, owner private key signature 210, and the public key for the first user. In an example, owner private key signature 210 may be a cryptographic signature for the owner of the endpoint node. Owner private key signature 210 may include a cryptographic hash of the request/permission and the cryptographic signature of this hash from owner private key 220.

In response to endpoint node 108 receiving request 130, the endpoint node, via a processor, may perform one or more suitable operations to determine whether the request is authoritative. For example, endpoint node 108 may verify owner private key signature 210 within first user certificate 202 with owner public key 120 of FIG. 1. Based on the verification of owner private key signature 210, endpoint node 108 may determine that the first user is authorized to delegate all authority. In an example, owner public key 120 may be stored in a TPM of endpoint node 108.

In response to the determination that the first user is authorized to delegate all authority, endpoint node 108 may determine what, if any, permissions the first user has delegated to the second user. Endpoint node 108 may utilize second user certificate 204 to determine what permissions the first user has delegated to the second user. For example, second user certificate 204 may include a field indicating that the second user is authorized to control all nodes in multiple node environment 100 of FIG. 1 including, but not limited to, endpoint nodes 108 and 110. In an example, endpoint node 108 may not have any prior knowledge of the first user. However, the previous certificate in the chain of certificates, such as first user certificate 202, may be signed by the owner of endpoint node 108, and the first user certificate may attest that the owner granted permissions or authority to the first user and may also include the first user public key. Endpoint node may verify digital signature attesting to the first user was signed by the first user private key based on the first user public key in first user certificate 202. Finally, endpoint node 108 may determine that work request 206 is valid because it was signed by second user private key 230, and the second user was authorized by the first user that in turn was authorized the owner of the endpoint node.

In certain examples, certificate policies within multiple node environment 100 may insist upon certain key management practices. For example, a certificate may include access control list (ACLs) type permissions, such as a holder of this certificate is authorized only to do particular requests. Additionally, conditions may be placed upon which kind of key management must be used, such the public key must be stored in a TPM, the key must stored in a particular type of TPM, the key must be from a TPM sealed within this type of hierarchy, or the like.

As described herein, multiple node environment 100 and nodes 102, 104, 106, 108 and 110 may be improved by implicit trust through cryptographic signature certificate chains. Additionally, the certificates may provide permissions through ACLs and create a hierarchal delegation of authority. The chain of certificates may also decrease security vulnerabilities by narrowing scope of authority, and decentralizing authority or storage. All of these benefits may be conveyed and verified within a single document and prior knowledge of an owner public key. In an example, the utilization of a certificate chain within a single request document enables the implementation of a full hierarchy of user management, such as assignment and delegation of permissions, users, identity and access, ACLs, or the like, without an endpoint node needing to rely on any trusted node to either store or implement logic for authorizing permissions.

In an example, the chain of certificates within a request may collapse the concepts of users, roles, ACLs, rules, permissions and requests into monolithic, self-contained messages that are independently verifiable. Thus, an endpoint node does not need to trust, be connected to, or have any information from any other external entities, nor does the request rely on any pre-existing state. Also, the chain of certificates may avoid external dependencies, and does not rely on the difficult synchronization of dependent data that would otherwise need to occur within a highly distributed and disaggregated system.

Figure 3:
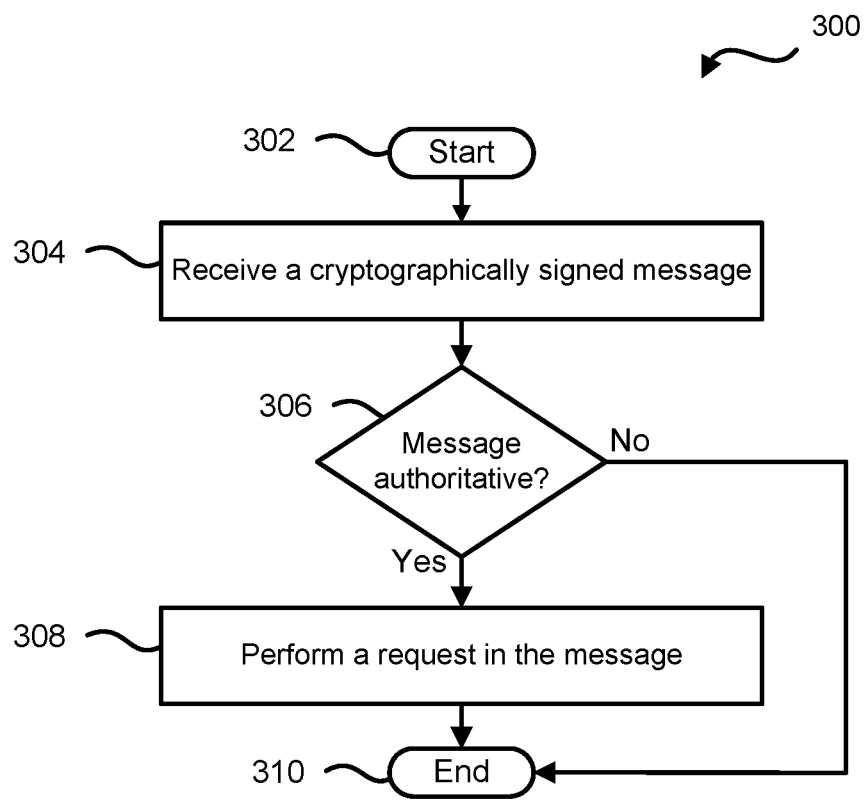
FIG. 3 is a flow diagram of a method for verifying and executing operations within a request according to at least one embodiment of the present disclosure.

FIG. 3 illustrates a flow of a method 300 for verifying and executing operations within a request according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure.

At block 304, a cryptographically signed message is received. In an example, the message may be received at any suitable node within a multiple node environment including, but not limited to, a control plane node and an endpoint node. In certain examples, the cryptographically signed message may be utilized to convey a request. The reception of a cryptographically signed message via any suitable means. For example, these messages may be pulled by the endpoint node from a source node or may be pushed to the node by one of several operations.

At block 306, a determination is made whether the message is authoritative. In an example, the message may be deemed authoritative by any suitable manner, such as a string of certificates granting a requestor associated with the message authority to request a specific request included in the message. In certain examples, the string of certificates may be any suitable number of certificates with keys granting the permission from an owner down to the requestor. For example, the endpoint node, via a processor, may perform one or more suitable operations to determine whether the message/request is authoritative. For example, the endpoint node may verify an owner private key signature within a first user certificate with an owner public key. Based on the verification of owner private key signature, the endpoint node may determine that the first user is authorized to delegate all authority. In an example, the owner public key may be stored in a TPM of endpoint node.

In response to the determination that the first user is authorized to delegate all authority, the endpoint node may determine what, if any, permissions the first user has delegated to the second user. The endpoint node may utilize a second user certificate to determine what permissions the first user has delegated to the second user. For example, the second user certificate may include a field indicating that the second user is authorized to control all nodes in a multiple node environment including, but not limited to, the endpoint that received the request/message.

In an example, the endpoint node may not have any prior knowledge of the first user. However, the previous certificate in the chain of certificates, such as the first user certificate, may be signed by the owner of the endpoint node, and the first user certificate may attest that the owner granted permissions or authority to the first user and may also include the first user public key. The endpoint node may verify that the digital signature attesting to the first user was signed by the first user private key based on the first user public key in the first user certificate. Finally, the endpoint node may determine that request/message is valid because it was signed by the second user private key, and the second user was authorized by the first user that in turn was authorized the owner of the endpoint node. If the message is determined to be authoritative, the flow continues at block 308. Otherwise, the flow ends at block 310. At block 308, the request within the message is executed, and the flow ends at block 310.

Figure 4:
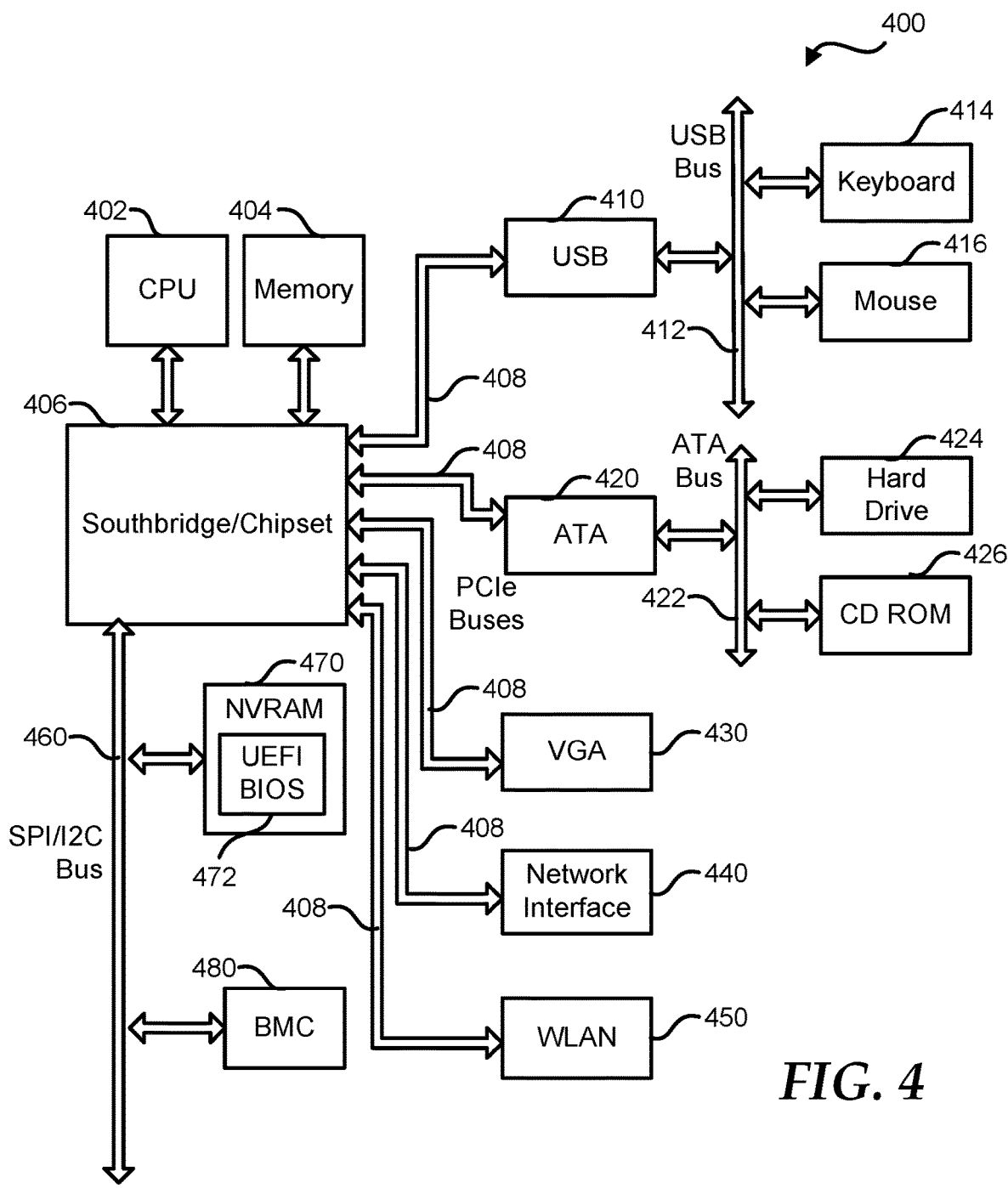
FIG. 4 is a block diagram of an information handling system according to an embodiment of the present disclosure.

FIG. 4 illustrates a general information handling system 400. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 400 includes a processor 402, a memory 404, a chipset 406, a PCI bus 408, a universal serial bus (USB) controller 410, a USB 412, a keyboard device controller 414, a mouse device controller 416, a configuration database 418, an ATA bus controller 420, an ATA bus 422, a hard drive device controller 424, a compact disk read only memory (CD ROM) device controller 426, a video graphics array (VGA) device controller 430, a network interface controller (MC) 440, a wireless local area network (WLAN) controller 450, a serial peripheral interface (SPI) bus 460, a flash memory device 470 for storing UEFI BIOS code 472, a trusted platform module (TPM) 480, and a baseboard management controller (EC) 490. EC 490 can be referred to as a service processor, and embedded controller, and the like. Flash memory device 470 can be referred to as a SPI flash device, BIOS non-volatile random access memory (NVRAM), and the like. EC 490 is configured to provide out-of-band access to devices at information handling system 400. As used herein, out-of-band access herein refers to operations performed without support of CPU 402, such as prior to execution of UEFI BIOS code 472 by processor 402 to initialize operation of system 400. In an embodiment, system 400 can further include a platform security processor (PSP) 474 and/or a management engine (ME) 476. In particular, an x86 processor provided by AMD can include PSP 474, while ME 476 is typically associated with systems based on Intel x86 processors.

PSP 474 and ME 476 are processors that can operate independently of core processors at CPU 402, and that can execute firmware prior to the execution of the BIOS by a primary CPU core processor. PSP 474, included in recent AMD-based systems, is a microcontroller that includes dedicated read-only memory (ROM) and static random access memory (SRAM). PSP 474 is an isolated processor that runs independently from the main CPU processor cores. PSP 474 has access to firmware stored at flash memory device 470. During the earliest stages of initialization of system 400, PSP 474 is configured to authenticate the first block of BIOS code stored at flash memory device 470 before releasing the x86 processor from reset. Accordingly, PSP 474 provides a hardware root of trust for system 400. ME 476 provides similar functionality in Intel-based systems. In another embodiment, EC 490 can provide aspects of a hardware root of trust. The root of trust relates to software processes and/or hardware devices that ensure that firmware and other software necessary for operation of an information handling system is operating as expected.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One ore more components can be integrated together. For example, portions of chipset 406 can be integrated within CPU 402. In an embodiment, chipset 406 can include a platform controller hub (PCH). System 400 can include additional buses and bus protocols, for example I2C and the like. Additional components of information handling system 400 can include one or more storage devices that can store machine-executable code, one or more communications ports for communicating with external devices, and various input and output (I/O) devices, such as a keyboard, a mouse, and a video display.

For purposes of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 400 can include processing resources for executing machine-executable code, such as CPU 402, a programmable logic array (PLA), an embedded device such as a System-on-a-Chip (SoC), or other control logic hardware. Information handling system 400 can also include one or more computer-readable medium for storing machine-executable code, such as software or data.

UEFI BIOS code 472 can be referred to as a firmware image, and the term BIOS is herein used interchangeably with the term firmware image, or simply firmware. In an embodiment, UEFI BIOS 472 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 400. While the techniques disclosed herein are described in the context of a UEFI compliant system, one of skill will appreciate that aspects of the disclosed systems and methods can be implemented at substantially any information handling system having configurable firmware.

UEFI BIOS code 472 includes instructions executable by CPU 402 to initialize and test the hardware components of system 400, and to load a boot loader or an operating system (OS) from a mass storage device. UEFI BIOS code 472 additionally provides an abstraction layer for the hardware, i.e. a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

The storage capacity of SPI flash device 470 is typically limited to 32 MB or 64 MB of data. However, original equipment manufacturers (OEMs) of information handling systems may desire to provide advanced firmware capabilities, resulting in a BIOS image that is too large to fit in SPI flash device 470. Information handling system can include other non-volatile flash memory devices, in addition to SPI flash device 470. For example, memory 404 can include non-volatile memory devices in addition to dynamic random access memory devices. Such memory is referred to herein as non-volatile dual in-line memory module (NVDIMM) devices. In addition, hard drive 424 can include non-volatile storage elements, referred to as a solid state drive (SSD). For still another example, information handling system 400 can include one or more non-volatile memory express (NVMe) devices. Techniques disclosed herein provide for storing a portion of a BIOS image at one or more non-volatile memory devices in addition to SPI flash device 470.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store an owner public key associated with an owner of the information handling system; and
   a processor in communication with the memory, the processor to:
   receive a cryptographically signed message including a chain of certificates, wherein the chain of certificates includes first and second certificates;
   determine whether the first certificate within the chain of certificates delegates authority to a first user based on the owner public key;
   in response to the first certificate delegating authority to the first user, determine whether the second certificate delegates authority from the first user to a second user;
   based on the first and second certificates, verify the cryptographically signed message as an authoritative message; and
   in response to the cryptographically signed message being verified as the authoritative message, execute a request associated with the cryptographically signed message,
   wherein the first certificate includes a first user public key associated with the first user,
   the chain of certificates further includes a work certificate, and
   the second certificate includes a second user public key associated with the second user.

2. The information handling system of claim 1, wherein the determination of whether the first certificate within the chain of certificates delegates authority to the first user based on the owner public key, the processor further to verify an owner signature in the first certificate with the owner public key stored in the memory.

3. The information handling system of claim 1, wherein the determination of whether the second certificate delegates authority from the first user to a second user, the processor further to verify a first user signature in the second certificate based on the first user public key in the first certificate.

4. The information handling system of claim 1, wherein the processor further to: verify a second user signature in the work certificate based on the second user public key in the second certificate; and in response to the second user signature being verified, verify the work certificate.

5. The information handling system of claim 1, wherein the memory is located within a trusted platform module of the information handling system.

6. The information handling system of claim 1, wherein the second certificate includes an access control list to indicate permissions authorized from the first user to the second user.

7. A method comprising:
   storing, in a memory of an information handling system, an owner public key associated with an owner of the information handling system;
   receiving, at the information handling system, a cryptographically signed message including a chain of certificates, wherein the chain of certificates includes first and second certificates;
   determining, by a processor of the information handling system, whether the first certificate within the chain of certificates delegates authority to a first user based on the owner public key;
   in response to the first certificate delegating authority to the first user, determining whether the second certificate delegates authority from the first user to a second user;
   based on the first and second certificates, verifying the cryptographically signed message as an authoritative message; and
   in response to the cryptographically signed message being verified as the authoritative message, executing, by the processor, a request associated with the cryptographically signed message,
   wherein the first certificate includes a first user public key associated with the first user,
   the chain of certificates further includes a work certificate, and
   the second certificate includes a second user public key associated with the second user.

8. The method of claim 7, wherein the determining of whether the first certificate within the chain of certificates delegates authority to the first user based on the owner public key, the method further comprises verifying an owner signature in the first certificate with the owner public key stored in the memory.

9. The method of claim 7, wherein the determining of whether the second certificate delegates authority from the first user to the second user, the method further comprises verifying a first user signature in the second certificate based on the first user public key in the first certificate.

10. The method of claim 7, further comprising: verifying a second user signature in the work certificate based on the second user public key in the second certificate; and in response to the second user signature being verified, verifying the work certificate.

11. The method of claim 7, wherein the memory is located within a trusted platform module of the information handling system.

12. The method of claim 7, wherein the second certificate includes an access control list to indicate permissions authorized from the first user to the second user.

13. A multiple node system comprising:
a first information handling system to:
generate a request and insert the request in a work certificate signed with a requesting user private key, wherein the requesting user private key is associated with a requesting user, wherein the work certificate is within a chain of certificates of a cryptographically signed message along with first and second certificates; and
send the cryptographically signed message; and
a second information handling system including:
a memory to store an owner public key associated with an owner of the second information handling system; and
a processor in communication with the memory, the processor to:
receive the cryptographically signed message from the first information handling system;
if a first certificate within the chain of certificates delegates authority to a first user based on the owner public key, then determine whether a second certificate delegates authority from the first user to the requesting user;
based on the first, second, and work certificates, verify the cryptographically signed message as an authoritative message; and
in response to the cryptographically signed message being the authoritative message, execute the request associated within the cryptographically signed message,
wherein the first certificate includes a first user public key associated with the first user and the second certificate includes a second user public key associated with the second user.

14. The multiple node system of claim 13, wherein the determination of whether the first certificate within the chain of certificates delegates authority to the first user based on the owner public key, the processor further to verify an owner signature in the first certificate with the owner public key stored in the memory.

15. The multiple node environment of claim 13, wherein the determination of whether the second certificate delegates authority from the first user to the requesting user, the processor further to verify a first user signature in the second certificate based on the first user public key in the first certificate.

* * * * *